United States Patent
Roth

(10) Patent No.: US 7,523,353 B2
(45) Date of Patent: Apr. 21, 2009

(54) METHOD FOR DETECTING HANG OR DEAD LOCK CONDITIONS

(75) Inventor: Robert Roth, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 512 days.

(21) Appl. No.: 11/284,524

(22) Filed: Nov. 21, 2005

(65) Prior Publication Data
US 2007/0168752 A1 Jul. 19, 2007

(51) Int. Cl.
G06F 11/00 (2006.01)

(52) U.S. Cl. .................. 714/42; 709/223; 711/109; 711/154; 714/45; 714/47; 714/48; 714/50; 714/51; 714/56; 370/248; 370/249; 370/250; 370/251; 370/252

(58) Field of Classification Search .............. 714/45, 714/47, 48, 50, 51, 56; 370/248–252; 711/109, 711/154; 709/223
See application file for complete search history.

(56) References Cited

U.S. PATENT DOCUMENTS

| | | | |
|---|---|---|---|
| 6,009,488 A | 12/1999 | Kavipurapu | 710/105 |
| 6,779,145 B1* | 8/2004 | Edwards et al. | 714/733 |
| 2003/0095555 A1* | 5/2003 | McNamara et al. | 370/401 |
| 2003/0192034 A1* | 10/2003 | Hayase | 717/128 |
| 2005/0117692 A1* | 6/2005 | Hunter et al. | 377/15 |
| 2006/0294427 A1* | 12/2006 | Glass et al. | 714/31 |
| 2007/0094154 A1* | 4/2007 | Rau et al. | 705/67 |
| 2007/0121489 A1* | 5/2007 | Roth et al. | 370/218 |

OTHER PUBLICATIONS

U.S. Appl. No. 11/167,965, filed Jun. 27, 2005 entitled "Method, Apparatus and System for Facilitating Debug for Link Interconnects," 21 pgs.

* cited by examiner

Primary Examiner—Robert Beausoliel
Assistant Examiner—Jeison C Arcos
(74) Attorney, Agent, or Firm—Trop, Pruner & Hu, P.C.

(57) ABSTRACT

A scheme for monitoring links in a point-to-point architecture computer system is discussed. The scheme monitors labels for transactions to determine if they have been reissued within a user selected time window. A corresponding position in a register is updated to reflect the value of the transaction identifier. Subsequently, after the expiration of a counter, the corresponding position in the registers is compared to other predetermined positions in other registers to determine if the transaction identifier has been used (reissued). Otherwise, a possible hang condition might have occurred.

22 Claims, 4 Drawing Sheets

Figure 4

| Fastest message class or transaction type | | | |
|---|---|---|---|
| TID # | Register values | | C1not |
| Address | C1 | C2 | mask |
| 0 | | | |
| 1 | | | |
| 2 | | | |
| 3 | | | |
| 4 | 1 | 1 | |
| 5 | 1 | | |
| 6 | | 1 | |
| 7 | | | 1 |
| 8 | | | |
| 9 | 1 | | |
| 10 | | | |
| 11 | | | 1 |
| 12 | | | |
| 13 | 1 | | |
| 14 | | | |
| 15 | | | 1 |
| 16 | | | |
| 17 | | | |
| 18 | | | |
| 19 | | | 1 |
| 20 | | | |
| 21 | | | |
| 22 | | | |
| 23 | | | 1 |
| 24 | | | |
| 25 | | | |
| 26 | | | |
| 27 | | | 1 |
| 28 | | | |
| 29 | | | |
| 30 | | | |
| 31 | | | 1 |

State machine
counter/timer Value
- 0 store C1
- 1 store C1
  - store C1
  - store C1
- N
  - 0 Store C2
  - 1 Store C2
    - Store C2
    - Store C2
- N  Store C2   Store not C2 in C3

| Next fastest message class or transaction type | | | |
|---|---|---|---|
| TID # | Register values | | C1Not |
| Address | C1 | C2 | mask |
| 0 | | | FALSE |
| 1 | | 1 | FALSE |
| 2 | | 1 | FALSE |
| 3 | | | TRUE |
| 4 | | | TRUE |
| 5 | | 1 | TRUE |
| 6 | | | FALSE |
| 7 | | 1 | FALSE |
| 8 | | | TRUE |
| 9 | | | TRUE |
| 10 | | 1 | FALSE |
| 11 | | | FALSE |
| 12 | | 1 | FALSE |
| 13 | | | TRUE |
| 14 | 1 | | TRUE |
| 15 | | 1 | FALSE |
| 16 | | 1 | FALSE |
| 17 | | 1 | FALSE |
| 18 | | 1 | FALSE |
| 19 | | | FALSE |
| 20 | | 1 | FALSE |
| 21 | | 1 | FALSE |
| 22 | | 1 | FALSE |
| 23 | | | FALSE |
| 24 | | 1 | FALSE |
| 25 | | 1 | FALSE |
| 26 | | | FALSE |
| 27 | | 1 | FALSE |
| 28 | | 1 | FALSE |
| 29 | | 1 | FALSE |
| 30 | | 1 | TRUE |
| 31 | | 1 | TRUE |

When counter value = N after the initial values are set then (store for at least two 2N before starting comparison tests)
Compare C1 on fastest message class to C2 on any register (R1 C1 with don't care mask from C1not) AND (R1C2 OR R2C2 OR R3C2 OR R4C2 OR R5C2 or R6C2)
IF false then stop trace
If true then shift C2 to C1 and reset C2 to zero and reset C1not mask to zero When TID is not re used in expected time period the assumption is there is a hang condition
Note this technique can be extended to performance analysis. Record the

| 3rd fastest message class or transaction type | | | |
|---|---|---|---|
| TID # | Register values | | C1not |
| Address | C1 | C2 | mask |
| 0 | | | TRUE |
| 1 | | | TRUE |
| 2 | | | TRUE |
| 3 | | | TRUE |
| 4 | | | TRUE |
| 5 | | | TRUE |
| 6 | | | TRUE |
| 7 | | | TRUE |
| 8 | | | TRUE |
| 9 | | | TRUE |
| 10 | | | TRUE |
| 11 | | | TRUE |
| 12 | | | TRUE |
| 13 | | | FALSE |
| 14 | | | TRUE |
| 15 | | | TRUE |
| 16 | | | TRUE |
| 17 | | | TRUE |
| 18 | | | TRUE |
| 19 | | | TRUE |
| 20 | | | TRUE |
| 21 | | | TRUE |
| 22 | | | TRUE |
| 23 | | | TRUE |
| 24 | | | TRUE |
| 25 | | | TRUE |
| 26 | | | TRUE |
| 27 | | | TRUE |
| 28 | | | TRUE |
| 29 | | | TRUE |
| 30 | | 1 | FALSE |
| 31 | | 1 | FALSE |

| 4th fastest message class or transaction type | | | |
|---|---|---|---|
| TID # | Register values | | C1not mask |
| Address | C1 | C2 | |
| 0 | | | TRUE |
| 1 | | | TRUE |
| 2 | | | TRUE |
| 3 | | | TRUE |
| 4 | | | TRUE |
| 5 | | | TRUE |
| 6 | | | TRUE |
| 7 | | | TRUE |
| 8 | | | TRUE |
| 9 | | | TRUE |
| 10 | | | TRUE |
| 11 | | | TRUE |
| 12 | | | TRUE |
| 13 | | | TRUE |
| 14 | | | TRUE |
| 15 | | | TRUE |
| 16 | | | TRUE |
| 17 | | | TRUE |
| 18 | | | TRUE |
| 19 | | | TRUE |
| 20 | | | TRUE |
| 21 | | | TRUE |
| 22 | | | TRUE |
| 23 | | | TRUE |
| 24 | | | TRUE |
| 25 | | | TRUE |
| 26 | | | TRUE |
| 27 | | | TRUE |
| 28 | | | TRUE |
| 29 | | | TRUE |
| 30 | | | TRUE |
| 31 | | | TRUE | etc

| TID # | Register values | | C1not mask |
|---|---|---|---|
| Address | C1 | C2 | |
| 0 | | | TRUE |
| 1 | | | TRUE |
| 2 | | | TRUE |
| 3 | | | TRUE |
| 4 | | | TRUE |
| 5 | | | TRUE |
| 6 | | | TRUE |
| 7 | | | TRUE |
| 8 | | | TRUE |
| 9 | | | TRUE |
| 10 | | | TRUE |
| 11 | | | TRUE |
| 12 | | | TRUE |
| 13 | | | TRUE |
| 14 | | | TRUE |
| 15 | | | TRUE |
| 16 | | | TRUE |
| 17 | | | TRUE |
| 18 | | | TRUE |
| 19 | | | TRUE |
| 20 | | | TRUE |
| 21 | | | TRUE |
| 22 | | | TRUE |
| 23 | | | TRUE |
| 24 | | | TRUE |
| 25 | | | TRUE |
| 26 | | | TRUE |
| 27 | | | TRUE |
| 28 | | | TRUE |
| 29 | | | TRUE |
| 30 | | | TRUE |
| 31 | | | TRUE |

Example shown for one message class
Other message class using same type of logic
but longer timer period.

METHOD FOR DETECTING HANG OR DEAD LOCK CONDITIONS

BACKGROUND OF THE INVENTION

1. Field of the Invention

The present invention relates to debug and testing of computer systems, specifically, for detecting hang or dead lock conditions.

2. Description of the Related Art

As the technology for manufacturing integrated circuits advances and demand for increased processor and memory performance, the debugging and testing integrated devices have significantly become more complex. Modern integrated circuit (IC) devices include large numbers of gates on a single semiconductor chip. As the complexity of the ICs increase, so does the cost and complexity of verifying/debugging functionality and electrically testing the individual IC and the systems in which they are employed. Testing and manufacturing costs and design complexity increase dramatically because of new manufacturing processes and new interconnect technologies.

One example of debugging system functionality is detecting a hang conditions, which can also be classified as dead lock logic bugs. A deadlock is a circular set of dependencies where one logic block is waiting for a second logic block, which is waiting for the first. A front side bus logic analyzer system has an easy to detect indicator of bus hang. In contrast, point-to-point architecture systems and trace data may be distributed on 8 to 10 logic analyzer trace instruments in 4 socket systems. As the symptom of a hang can be from any socket on any port, potentially any/all link pair(s) might need to be set up for cross triggering.

Traditional logic analyzers do not transform the data in real time for a compressed view of data traffic from multiple buses or logic analyzers. They can only filter but not transform the data. Therefore, present solutions for detecting the hang condition are not feasible.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

FIG. 4 is a method for analyzing stored values for message labels for a message class as utilized in accordance with the claimed subject matter.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

The current application may utilize embodiments depicted in related applications P21898, filed on the same date. P21898 is entitled " " with inventors, "Robert Roth, Bharadwaj Pudipeddi, Madhu Athreya, and Richard Glass.

One area of current technological development relates to efficient system testing and validation. As previously described, the existing logic analyzers and solutions do not transform the data in real time for a compressed view of data traffic from multiple buses or multiple logic analyzers. They can only filter but not transform the data. Therefore, present solutions for detecting the hang condition are not feasible.

In contrast, a method is proposed that facilitates debug by detecting hang conditions by monitoring labels for transactions to determine if they have been reissued within a user selected time window. Likewise, the claimed subject matter may be used to monitor credit flow or system stress by monitoring the type and number of message classes that are utilizing a particular virtual channel or ratios of types of traffic.

Figure 1:
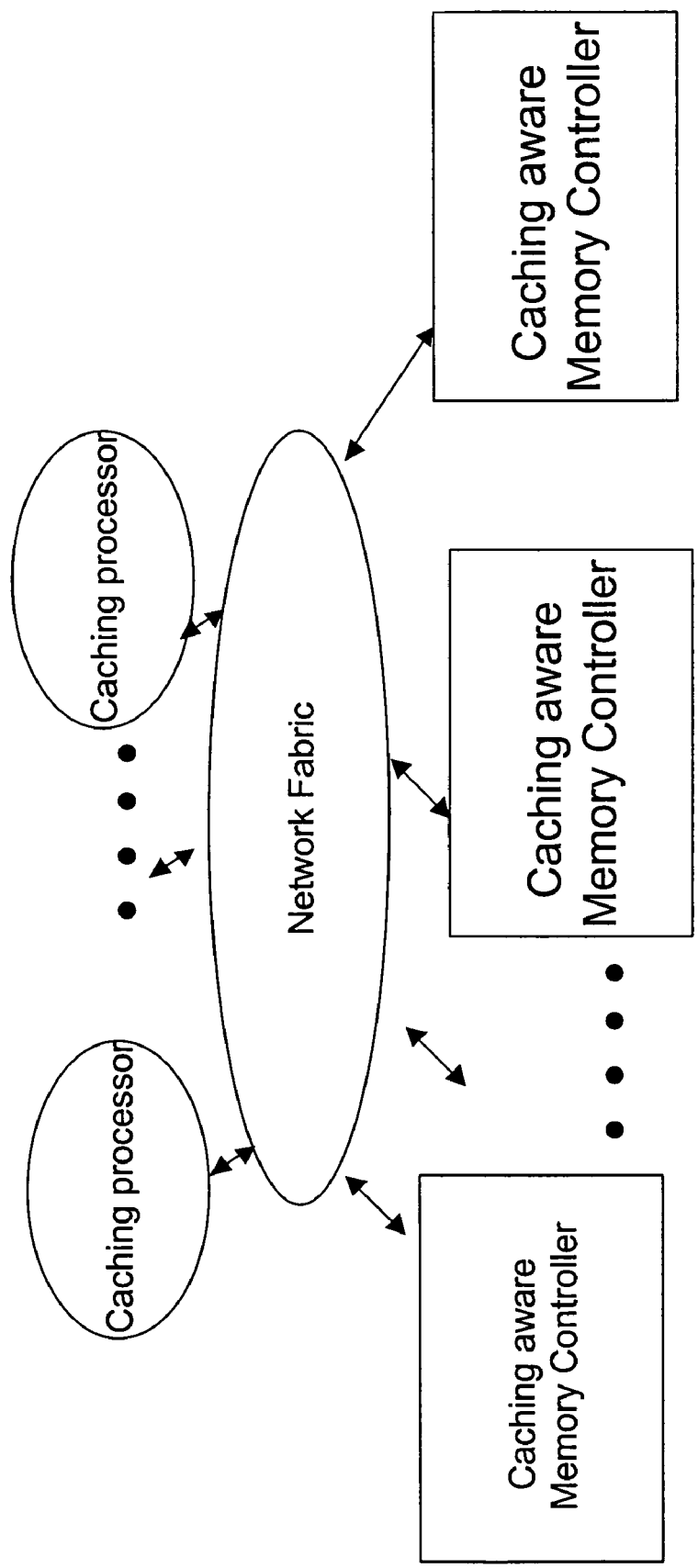
FIG. 1 is a protocol architecture as utilized by one embodiment.

In one embodiment, the claimed subject matter facilitates debug on links that connect a Fully Buffered DIMMs (FBD), wherein the FBD link is a serial link for connecting memory modules to a host controller device (such as a processor or memory hub). In one embodiment, the claimed subject matter utilizes a point-to-point (pTp) architecture that supports a layered protocol scheme, FIG. 1 illustrates one example of a cache coherence protocol's abstract view of the underlying network. In one embodiment, the claimed subject matter may be utilized for an architecture that depicts a plurality of caching agents and home agents coupled to a network fabric (see FIG. 1). For example, the network fabric adheres to a layered protocol scheme and comprised of: a physical layer, a link layer, a routing layer, a transport layer and a protocol layer(as depicted in connection with FIG. 2),. The fabric facilitates transporting messages from one protocol (caching processor or caching aware memory controller) to another protocol for a point-to-point network. In one aspect, the figure depicts a cache coherence protocol's abstract view of the underlying network.

FIG. 1 is a high level, simplified abstraction of a protocol architecture as utilized by one embodiment. The fabric facilitates transporting messages from one protocol (caching processor agent or caching aware memory controller agent) to another protocol for a point to point network. In one aspect, the figure depicts a cache coherence protocol's abstract view of the underlying network.

The agents communicate with one another via messages. In one embodiment, each agent is referenced by its node id and each message is given a label. In one embodiment, a transaction identifier (TID) is a label on a particular transaction leaving an agent. Furthermore, there may be several classes of messages, such as, but not limited to snoop messages, home messages, non data response messages, and data response messages. Within each message class, there may be sub message classes. For example, a home message class may have several sub message classes, such as, home request messages, home writeback messages, and home snoop response messages. However, the claimed subject matter is not limited to the preceding examples of message and sub message classes. One skilled in the art appreciates utilizing different message classes and sub message classes.

Figure 2:
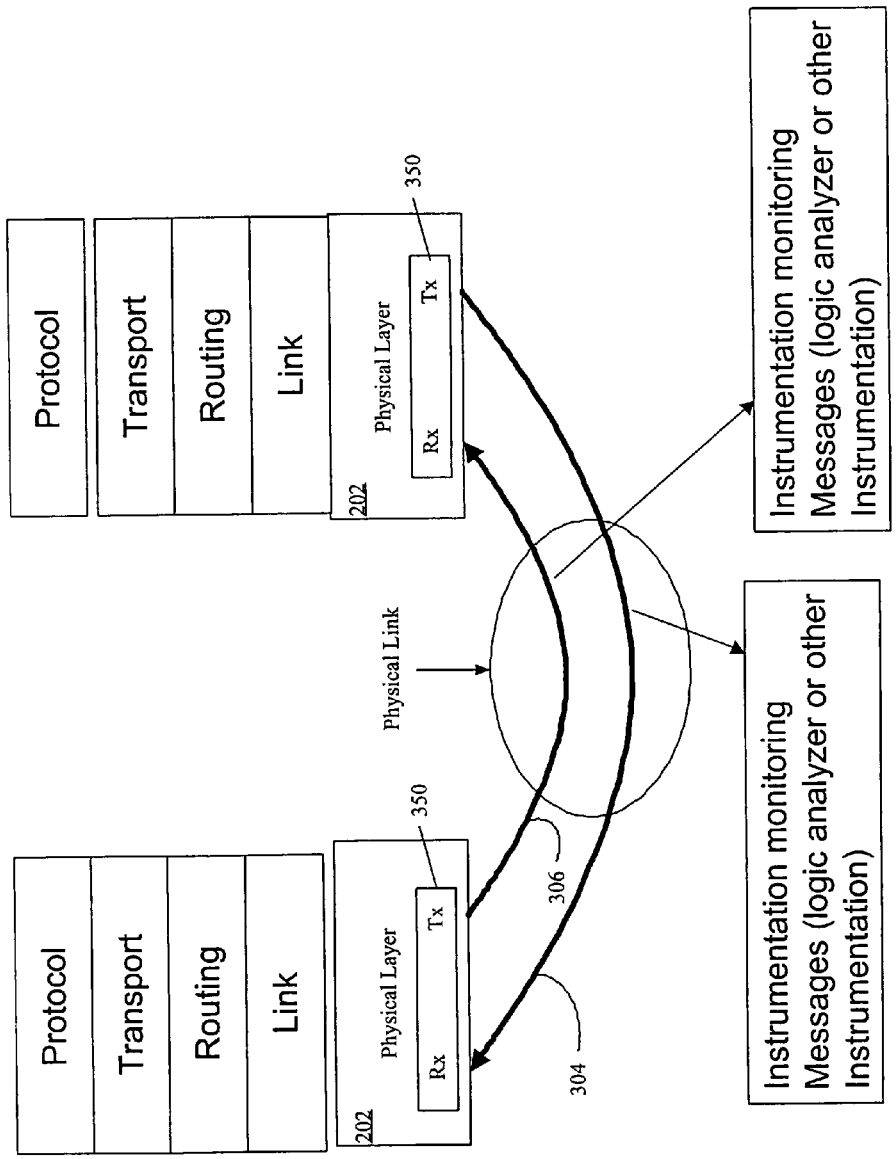
FIG. 2 is a block diagram of an apparatus for a physical interconnect utilized in accordance with the claimed subject matter.

FIG. 2 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

In one embodiment, "C1 not mask" is used for the logic to ignore the TID, unique identifier or label not associated with a selected message type. The claimed subject matter allows for assignment of a specific label to any message type. So only a few of the message labels will be assigned to a specific message type in any time window. Those specific message labels associated with a given message type are expected to finish in a second time window and the completion noted when the label is reused for any message type. The "C1 not mask" is used in one scheme of AND and OR gates to determine if a label has been re-used but only for those labels that were noted in a previous time window for a specific message type or class.

In one embodiment, the claimed subject matter for monitoring virtual channels. For example, VNA is the main virtual channel and overflow would be sent to VN0 or in some cases VN0 or VN1. So if you detect the use of VN0 or VN1 more often that normal operation, that could indicate a hang condition or problem with credit flow. The logic to monitor this could be a counter for VNA, VN0 and VN1 for a selected time window. At the end of the selected time window the ratio of VN0 to VNA or VN1 to VNA could be check against a not to exceed threshold selected by the end user.

Figure 3:
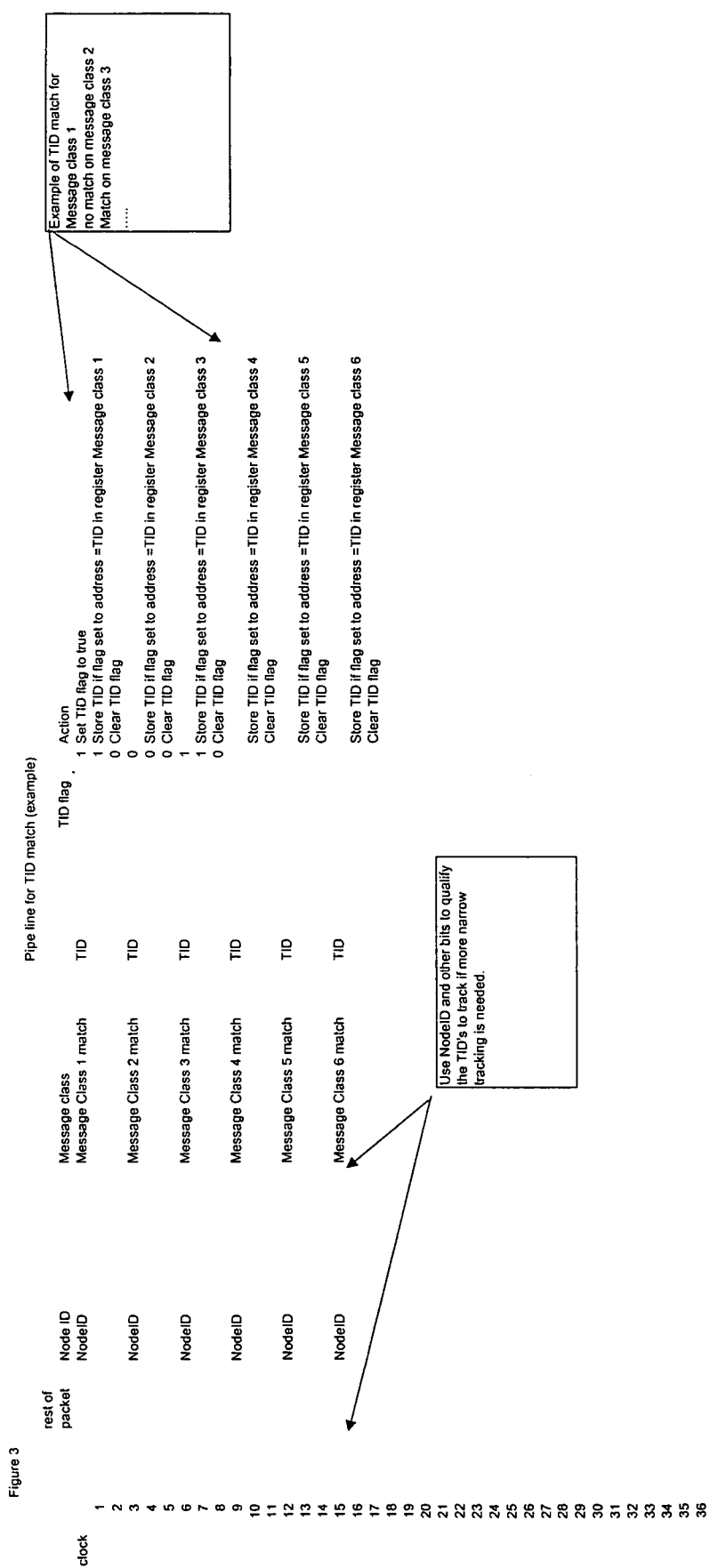
FIG. 3 is a method for analyzing a match between message classes utilized in accordance with the claimed subject matter.

FIG. 3 is a method for analyzing a match between message classes utilized in accordance with the claimed subject matter. In one embodiment, the claimed subject matter allows for monitoring the history of any virtual channel and the corresponding transaction identifiers for each message class to allow for monitoring on all links in parallel. Then, a counter with selected tap values or multiple counters is (are) used to periodically check if the transaction identifier for the particular message class has been used (reissued) within a user selected time period.

In one embodiment, the monitoring is done by first writing a binary one value in a corresponding register for each time a particular transaction identifier value occurs. For example, if the value of the transaction identifier is "7", a write to position 7 is done in the particular register. Upon the expiration of the counter value, one checks the value of the positions of the register to see if the positions in the registers are zero and to reset the register values to zero. In another embodiment, registers are dedicated to a particular messages class and other qualifiers for a given link direction. Thus, one can monitor whether a particular message class and time period is experiencing a problem since they are only uses a few transaction identifiers in one selected window of time, despite typically using several transaction identifiers for all transactions.

In FIG. 3, the example shows values being stored in registers for a particular match for a transaction identifier. Then, each subsequent message class is analyzed. In this example, a match occurs for message classes 1 and 3.

FIG. 4 is a method for analyzing stored values for message labels for a message class as utilized in accordance with the claimed subject matter. As previously mentioned, a write operation of a binary one value in a corresponding register is performed for each time a particular transaction identifier value occurs into C1 for initial values and C2 for the second occurrence. When counter value=N after the initial values are set then checks if labels are reissued (store for at least two 2N clock periods before starting comparison tests). Subsequently, the analysis compares C1 on fastest message class to C2 for any register. If false then stop trace, otherwise, then shift C2 to C1 and reset C2 to zero and reset C1 not mask to zero. In summary, when a transaction identifier (TID) is not re used in expected time period the assumption is there is a hang condition.

Also, the claimed subject matter may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone).For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals). For example, the methods depicted in connection with FIGS. 3 and 4 may be implemented by software for an automatic test equipment or a logic analyzer.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A method for tracing message transactions on a plurality of links comprising:
   writing a binary one value to a predetermined position in a first register for each time a particular transaction identifier value occurs for a duration of either a counter reaching a set counter value or a timer equals a predetermined value;
   subsequently writing a binary one value to a predetermined position in a second register for each time a particular transaction identifier value occurs for a duration of the counter; and
   checking the value of the first register and the second register to see if there are binary one values in the predetermined position in the first register to the corresponding position in the second register, if so, shifting the binary one value from the predetermined position in the second register to the predetermined position in the first register and resetting the predetermined position of the second register to a binary zero value, otherwise, stopping the trace or identifying the event for storage, to determine whether a hang condition may have occurred.

2. The method of claim 1 wherein the checking the value of the first register and the second register is done after a duration of twice the value of the counter reaching the set counter value or the timer equals the predetermined value.

3. The method of claim 1 wherein stopping the trace indicates the hang condition since the transaction identifier was not reused within a duration of the value of the counter reaching the set counter value or the timer equals the predetermined value.

4. The method of claim 1 wherein the plurality of links include a plurality of uni-directional links of a point-to-point architecture.

5. The method of claim 4 wherein the point-to-point architecture supports a layered protocol.

6. A method for tracing message transactions for a plurality of message classes for each direction of a link for a plurality of links comprising:
dedicating registers for each of the plurality of classes for each direction of a link for a plurality of links; and for each message class performing;
writing a binary one value to a predetermined position in a first register for each time a particular transaction identifier value occurs for a duration of a counter reaching a set counter value or a timer equals a predetermined value;
subsequently writing a binary one value to a predetermined position in a second register for each time a particular transaction identifier value occurs for a duration of the counter; and
checking the value of the first register and the second register to see if there are binary one values in the predetermined position in the first register to the corresponding position in the second register, if so, shifting the binary one value from the predetermined position in the second register to the predetermined position in the first register and resetting the predetermined position of the second register to a binary zero value otherwise, stopping the trace, to determine whether a hang condition may have occurred.

7. The method of claim 6 wherein the checking the value of the first register and the second register is done after a duration of twice the value of the counter reaching the set counter value or the timer equals the predetermined value.

8. The method of claim 6 wherein stopping the trace indicates the hang condition since the transaction identifier was not reused within a duration of the value of the counter.

9. The method of claim 6 wherein the plurality of links include a plurality of uni-directional links of a point-to-point architecture.

10. The method of claim 9 wherein the point-to-point architecture supports a layered protocol.

11. The method of claim 9 wherein the message classes are snoop messages, home messages, non data response messages, and data response messages.

12. A method for tracing message transactions on a plurality of links comprising:
writing a binary one value to a predetermined position in a first register for each time a particular transaction identifier value occurs for a duration of a counter;
subsequently writing a binary one value to a predetermined position in a plurality of registers to represent for each time a particular transaction identifier value occurs for a duration of the counter; and
checking the value of the first register and the second register to see if there are binary one values in the predetermined position in the first register to the corresponding position in the second register, if so, shifting the binary one value from the predetermined position in the second register to the predetermined position in the first register and resetting the predetermined position of the second register to a binary zero value otherwise, stopping the trace, to determine whether a hang condition may have occurred.

13. The method of claim 12 wherein the checking the value of the first register and the second register is done after a duration of twice the value of the counter reaching the set counter value or the timer equals the predetermined value.

14. The method of claim 12 wherein stopping the trace indicates the hang condition since the transaction identifier was not reused within a duration of the value of the counter reaching the set counter value or the timer equals the predetermined value.

15. The method of claim 12 wherein the plurality of links include a plurality of uni-directional links of a point-to-point architecture.

16. The method of claim 15 wherein the point-to-point architecture supports a layered protocol.

17. A machine-readable storage medium having a plurality of machine readable instructions, wherein when the instructions are executed by a system, the instructions enable tracing message transactions on a plurality of links of the system comprising:
writing a binary one value to a predetermined position in a first register for each time a particular transaction identifier value occurs for a duration of a counter reaching a set counter value or a timer equals a predetermined value;
subsequently writing a binary one value to a predetermined position in a plurality of registers to represent for each time a particular transaction identifier value occurs for a duration of the counter; and
checking the value of the first register and the second register to see if there are binary one values in the predetermined position in the first register to the corresponding position in the second register, if so, shifting the binary one value from the predetermined position in the second register to the predetermined position in the first register and resetting the predetermined position of the second register to a binary zero value, otherwise, stopping the trace, to determine whether a hang condition may have occurred.

18. The machine-readable storage medium of claim 17 wherein the checking the value of the first register and the second register is done after a duration of twice the value of the counter reaching the set counter value or the timer equals the predetermined value.

19. The machine-readable storage medium of claim 17 wherein stopping the trace indicates the hang condition since the transaction identifier was not mused within a duration of the value of the counter reaching the set counter value or the timer equals the predetermined value.

20. A machine-readable storage medium having a plurality of machine readable instructions, wherein when the instructions are executed by a system, the instructions provide for tracing message transactions for a plurality of message classes for each direction of a link for a plurality of links of the system comprising:
dedicating registers for each of the plurality of classes for each direction of a link for a plurality of links; and for each message class performing:
writing a binary one value to a predetermined position in a first register for each time a particular transaction identifier value occurs for a duration of a counter;
subsequently writing a binary one value to a predetermined position in a second register for each time a particular transaction identifier value occurs for a duration of the counter reaching a set counter value or timer equals a predetermined value; and
checking the value of the first register and the second register to see if there are binary one values in the predetermined position in the first register to the corresponding position in the second register, if so, shifting the binary one value from the predetermined position in the second register to the predetermined position in the first register and resetting the predetermined position of the second register to a binary zero value otherwise, stopping the trace, to determine whether a hang condition may have occurred.

21. The machine-readable storage medium of claim 20 wherein the checking the value of the register is done after a duration of twice the value of the counter reaching the set counter value or the timer equals the predetermined value.

22. The machine-readable storage medium of claim 20 wherein stopping the trace indicates hang condition since the transaction identifier was not reused within a duration of the value of the counter reaching set counter value or the timer equals the predetermined value.

* * * * *

UNITED STATES PATENT AND TRADEMARK OFFICE
CERTIFICATE OF CORRECTION

PATENT NO. : 7,523,353 B2  Page 1 of 1
APPLICATION NO. : 11/284524
DATED : April 21, 2009
INVENTOR(S) : Robert Toth It is certified that error appears in the above-identified patent and that said Letters Patent is hereby corrected as shown below:

Col. 6:
Line 44, "mused" should be --reused--.

Signed and Sealed this
Twenty-third Day of October, 2012

David J. Kappos
*Director of the United States Patent and Trademark Office*